April 24, 1962  M. O'BRIEN  3,030,811
FRUIT BIN SAMPLER
Filed Feb. 29, 1960  3 Sheets-Sheet 1
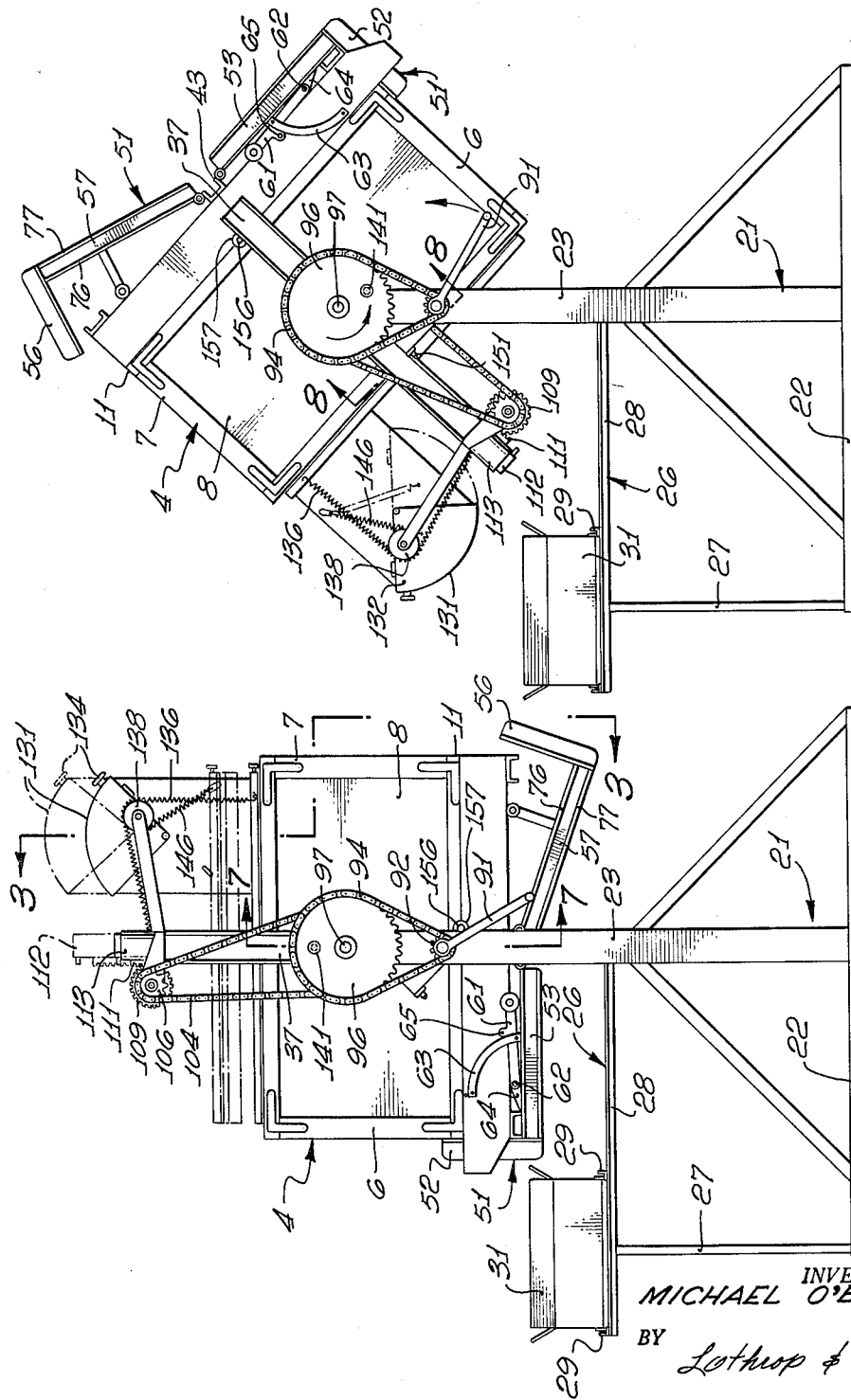
INVENTOR.
MICHAEL O'BRIEN
BY Lothrop & West
ATTORNEYS.

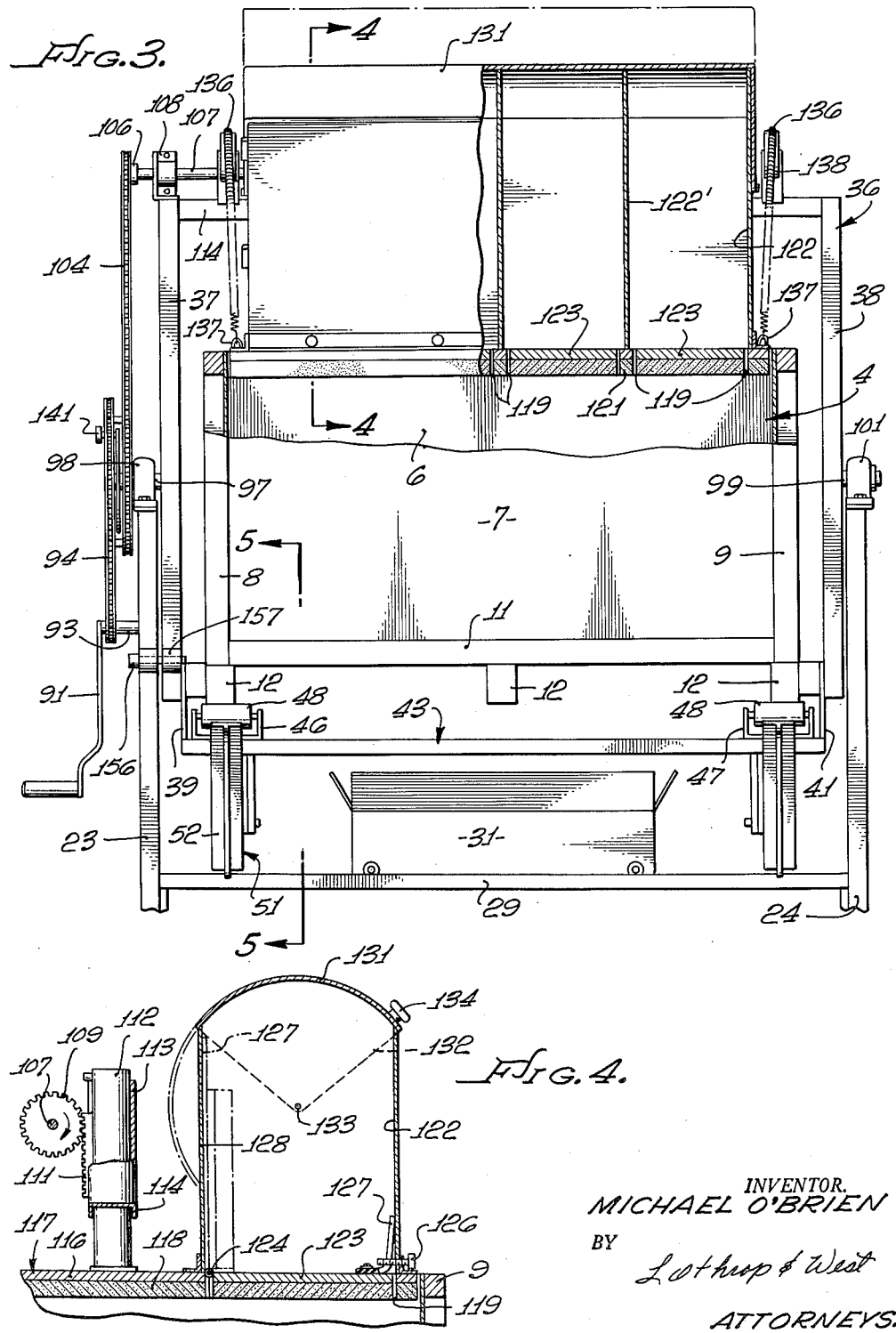

April 24, 1962     M. O'BRIEN     3,030,811
FRUIT BIN SAMPLER
Filed Feb. 29, 1960     3 Sheets-Sheet 3
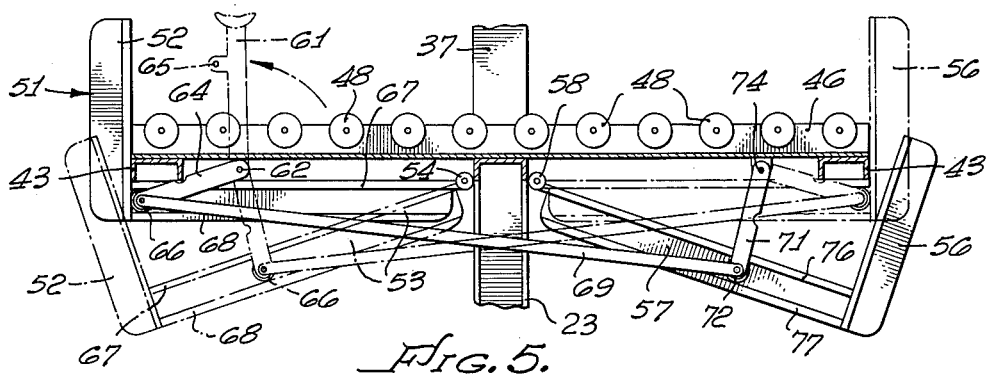
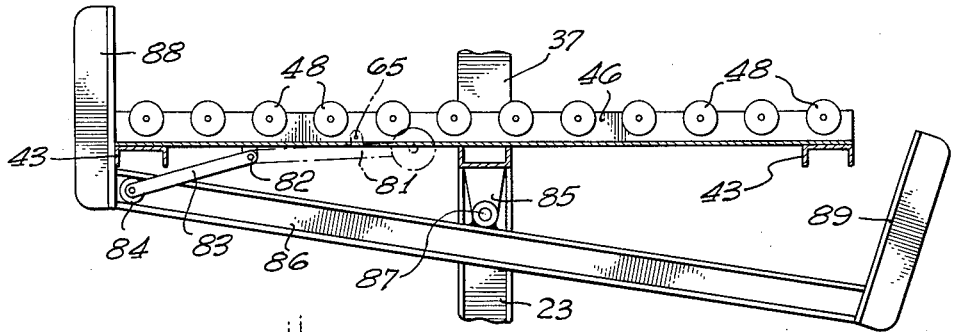
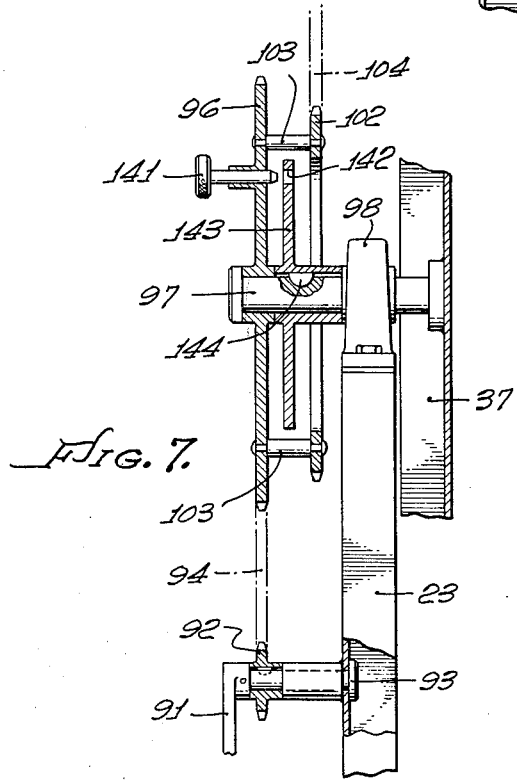
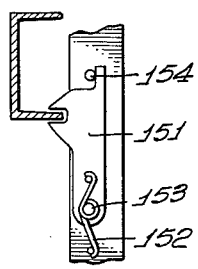
INVENTOR.
MICHAEL O'BRIEN
BY *Lothrop & West*
ATTORNEYS.

United States Patent Office 3,030,811
Patented Apr. 24, 1962

3,030,811
FRUIT BIN SAMPLER
Michael O'Brien, Davis, Calif., assignor to The Regents of The University of California, Berkeley, Calif.
Filed Feb. 29, 1960, Ser. No. 11,559
10 Claims. (Cl. 73—424)

My invention is especially concerned with mechanism for permitting the rapid sampling of a supply of fruit, such as a binful of fruit, preferably during the transit of the fruit from the field into the processing establishment.

It has become customary in handling fruit, particularly apples, pears and peaches, to transport the just-picked fruit from the field to a packing station in an open-top, generally rectangular bin, particularly one that is arranged for lifting by a fork truck. The payment for the so-transported fruit is usually dependent upon the grading of the fruit. Since it is impracticable to grade the entire binful, it is customary to take an arbitrary sample of the fruit for grading purposes. Heretofore, this has involved a relatively slow and sometimes inaccurate manual selecting operation subject to accusations of unfairness or favoritism either by the purchaser or by the seller.

It is therefore an object of the invention to provide a fruit bin sampler which operates quickly on or with a bin of fruit during the transit of the material from the field to the processing establishment without any substantial delay.

Another object of the invention is to provide a fruit bin sampler that can easily handle the type of bins now prevalent.

A still further object of the invention is to provide a fruit bin sampler effective to provide consistent results in selecting a sample without possibility of manual or personal variation.

Another object of the invention is to provide a fruit bin sampler having certain random features to preclude prearrangement of the fruit to afford a false indication.

Another object of the invention is to provide a fruit bin sampler which is readily installed in the entrance of a packing establishment without material rearrangement thereof.

A still further object of the invention is to provide a fruit bin sampler that is easily manipulated by workmen normally available at a fruit packing establishment.

A still further object of the invention is to provide a fruit bin sampler that is easy to fabricate and can easily and economically be supplied for seasonal use.

Another object is in general to provide an improved fruit bin sampler.

Other objects, together with the foregoing, are attained in the embodiment of the invention described in the accompanying description and illustrated in the accompanying drawings in which:

FIGURE 1 is a side elevation of a fruit bin sampler constructed in accordance with the invention and with a fruit bin installed therein in initial position;

FIGURE 2 is a view similar to FIGURE 1 but disclosing the mechanism with the fruit bin in a substantially inverted position;

FIGURE 3 is a combined elevation and cross section, the planes of the view being indicated by the line 3—3 of FIGURE 1;

FIGURE 4 is a detailed cross section the plane of which is indicated by the line 4—4 of FIGURE 3;

FIGURE 5 is a cross section on a longitudinal vertical plane, indicated by the line 5—5 of FIGURE 3, showing the construction detail of one form of bin support and restraining mechanism;

FIGURE 6 is a view similar to FIGURE 5 but showing a modified form of bin support and restraining mechanism;

FIGURE 7 is a detail showing in cross section some of the handling mechanism, the plane of section being indicated by the line 7—7 of FIGURE 1; and FIGURE 8 is a detail of a retaining latch illustrated in a section, the plane of which is indicated by the line 8—8 of FIGURE 2.

While the fruit bin sampler can be utilized in a number of different environments and with a number of different fruits and can readily be altered and modified to accommodate particular field conditions, it has successfully been incorporated as shown herein primarily for use with a fruit bin for retaining peaches, for example. The bin 4, particularly as shown in FIGURES 1–3 inclusive, is a generally rectangular structure having a front wall 6, a rear wall 7, side walls 8 and 9 and a bottom wall 11 supported on pallet beams 12. The bin 4 so formed is not closed at the top, but is entirely open to leave a generally square or rectangular upper opening. In the field, the picked fruit is dumped indiscriminately into the interior of the bin to a level very close to but not quite approaching the top margin of the bin.

The loaded bin is then transported in the customary way to the packing house or canning establishment. At the receiving station the bin is loaded temporarily into the fruit bin sampler constructed in accordance with the invention.

The sampler itself includes a support 21 which is a framework fabricated of the customary shapes and angles and includes not only a base 22 but also a pair of uprights 23 and 24. At a convenient location on the support 21 and approximately at waist height, there is provided a sampling table 26 having a support 27 and braces 28 as well as guides 29 to receive a sample box 31. The box 31 can be positioned at any convenient location transversely of the table 26 and can easily be set upon the sampling table or removed therefrom.

In accordance with the invention, there is provided on the support 21 a suitable frame 36. This also is fabricated of the customary structural shapes and is especially inclusive of a pair of side beams 37 and 38 at their lower ends connected to side plates 39 and 41 secured to a bin platform 43 or support to receive the weight of the bin 4. Included in the platform 43 are channels 46 and 47 extending longitudinally and serving as supports for a plurality of rollers 48 positioned directly to support the bottom beams 12 of the bin 4.

Since the bin can be positioned on the support rollers 48 from either end of the structure, depending on the particular setup, means are provided for restraining a bin on the platform 43 no matter from what direction it has been positioned. For this reason, secured to the platform 43 is a structure of the sort shown in FIGURES 1 and 5, for example. There is a forward retainer 51 including upright members 52 at the lower end secured to side arms 53 connected by pivot connections 54 to structure joined to the side beams 37 and 38. The retainer 51 is movable, as shown in FIGURE 5, between an upper position blocking the bin from traversing this end of the platform and a lower position below the rollers 48 permitting the bin freely to traverse this end of the platform. A similar pair of upright members 56 mounted on arms 57, connected by pivots 58 to structure joined to the side beams 37 and 48, is afforded to control traverse of the bin over the other end of the platform. Thus the bin is initially stopped in proper location no matter from which end loaded.

Means are provided for simultaneously actuating the restraining members 52 and 56 but in opposite directions. A hand lever 61 is connected to a cross shaft 62 and is restrained by a guide strap 63. A manually releasable spring pin 65 holds the lever in either extreme position by engaging suitable apertures in the frame. The cross shaft 62 carries arms 64 having rollers 66 operating between flanges 67 and 68 on the arms 53. Tie rods 69 extend to similar roller arms 71 carrying rollers 72 at the lower end and connected by pivots 74 to the platform 43. The rollers 72 are confined between flanges 76 and 77 on the arms 57.

In the operation of this structure, the spring pin 65 is manually withdrawn and the lever 61 is moved manually from the position shown in FIGURE 1 to the position shown in FIGURE 5 wherein the released spring pin 65 snaps into holding position. The lever movement causes the rollers 66 and 72 to traverse their respective channels and to rock the restraining members 52 downwardly while the restraining members 56 are rocked upwardly. Thus, either end of the platform is blocked when the other end is freed.

As an alternative construction of this mechanism, there is afforded a device as shown in FIGURE 6 in which a hand lever 81 is connected to a cross shaft 82 having arms 83 with rollers 84 at the lower extremity. A pair of longitudinal channels 86 receive the rollers 84 and are connected to a bracket 85 on the side beams 37 and 38 by a pivot mounting 87. Restraining members 88 and 89 stand up from the opposite ends of the longitudinal channels 6. In the operation of this device, manipulation of the lever 81 causes the rollers 84 to traverse the channels 86 to move the uprights 88 and 89 alternately into blocking position so that the platform is blocked at one end with the other end free or vice versa.

In the use of the structure, the forward end is the one preferably blocked, as shown in FIGURE 1, after the bin 4 is positioned on the support rollers 48 of the platform 43. The lever 61 (or the lever 81) if not already in position, is so manipulated as to block the bin at its forward end and thus to retain or hold the bin in position during clockwise rotation (as seen in FIGURE 1) but before actual inversion of the bin means are also positioned to retain the contents of the bin without spilling during the inversion.

Conveniently mounted on the upright 23 of the support mechanism is a hand crank 91 (FIGS. 1 and 3) connected to rotate a sprocket 92 on a spindle 93. A chain 94 encompasses the sprocket 92 and likewise is trained around a large sprocket 96 mounted to rotate on a stub axle 97 turnable in a pillow block 98 at the upper end of the upright 23 and fastened to the side beam 37. There is a similar stub axle 99 running in a pillow block 101 at the other side of the support on the upright 24 and fastened to the side beam 38.

The rotation of the sprocket 96, which is free on the stub axle 97, is imparted to a ring sprocket 102 parallel to the sprocket 96 and connected thereto by a plurality of spacers 103. A chain 104 extends from the ring sprocket 102 to a drive sprocket 106 fastened on one end of a drive shaft 107 extending transversely of the mechanism and supported in bearing blocks 108. Adjacent the center of the machine, the shaft 107 carries a gear 109 (FIG. 2 and FIG. 4) meshing with a rack 111 projecting from a plunger 112. The plunger is a circular cylindrical member, except for the projecting rack 111, and is vertically slidable in a sleeve 113 slotted along one element to permit passage of the rack 111 and upstanding from a cross channel 114 spanning the space between and secured to the side beams 37 and 38.

To the lower end of the plunger 112 is secured the top plate 116 of a lid 117 for the bin. The plate 116 is preferably a planar, square or rectangular member of a size to fit well but with some freedom within the open upper end of the bin. The composite lid includes not only the plate 116 but also a lining 118 of sponge rubber or similar material to avoid any possible bruising of or damage to the bin fruit. The traverse of the plunger 112 is such that the lid 117 can easily be lowered into the upper portion of the bin and can be lowered through varying distances and at least sufficiently to come into firm contact, or nearly firm contact, with varying depths of fruit therein.

The lid 117 is also formed to provide a series of openings 119, each of which is approximately rectangular, leaving a supporting portion 121 of the lid therebetween. Superimposed on the lid 117 and overlying all of the openings 119 is a chamber 122, preferably fabricated of metal, and firmly secured to the plate 116. The chamber 122 has a number of partitions 122' to divide the chamber into compartments each in communication with the bin through the respective one of the intervening openings 119. This communication is preferably controlled by doors 123 constructed similarly to the lid 117 and connected thereto at one end by suitable hinges 124. The individual doors 123 can be retained in closed position blocking communication between the bin and the chamber 122 by readily retractable thumb screws 126. Rubber flaps 127 are secured to the doors 123 so as to lie snugly against the forward wall 128 of the chamber whenever the doors 123 are in open position.

The upper portion of the chamber 122 is closed by a movable cover 131, or hood, preferably an arcuate metal plate having end pieces 132 which are mounted by pivots 133 to the side walls of the chamber. There is a handle 134 so that the hood or cover 131 can readily be manipulated between its closed position as shown in full lines in FIGURE 4 and an open position shown by dotted lines therein. The hood, being arcuate, can be opened and closed without changing the chamber volume and without shifting or dislodging any fruit pressing against it when inverted.

Since the lid 117 and its attendant mechanism is relatively heavy, it is counterbalanced, at least in part, by a pair of springs 136 attached at one end to eyelets 137 in the lid and passing over arcuate guides 138 on the frame 36 and at the other end appropriately fastened thereto.

In the operation of this structure, the binful of fruit is positioned on the platform, as previously described, and the lever 61 (or the lever 81) is operated to block the bin from rolling in a forward direction and to assist in supporting the bin during rotation. The crank 91 is then rotated in a clockwise direction, as seen in FIGURE 1, to lower the plunger 112 so as to position the lid 117 within the upper open end of the bin and in light contact with the fruit therein. The operator then stops turning the crank 91. He then moves a plunger 141 (FIGURE 7) from its retracted position entirely contained within the sprocket 96 into a projected position in which the plunger 141 extends through an aligned one of several apertures 142 in a central disc 143 joined to the stub axle 97 by a key 144.

The operator then resumes turning the crank 91 but in a counterclockwise direction, as seen in FIGURE 1. After the projection of the plunger 141 to engage the disc 143, the rotation of the sprocket 96 is effective to rotate the stub axle 97. The frame 36 is thus rotated counterclockwise (FIG. 1) about the axis of the stub axles 97 and 99 until it is substantially inverted as shown in FIGURE 2. The counterclockwise rotation of the sprocket 96 in inverting the bin, although accompanied by rotation of the sprocket 102, does not substantially change the position of the lowered lid with respect to the bin.

During the inversion of the bin, the fruit therein is prevented from discharging because of the lid. The operator, depending upon the randomly chosen portion of the bin from which it is desired to take a sample, frees one and only one of the doors 123 by outwardly slackening one of the thumb bolts 126 while leaving the others projecting inwardly. The freed door can be chosen just before or during inversion and at random by the inspector thus preventing any advantage by prearrangement of the fruit. Since a square bin can be arbitrarily positioned during loading in any of four ways and since the chamber is offset, a random, fair sample can always be obtained.

Three of the doors 123 are held in closed position and hold back the adjacent fruit, but during the inversion of the mechanism the door which is freed swings by gravity against the front wall of the chamber 122. By gravity, a sample of the fruit then falls into and occupies the chamber 122, lying largely against and being supported by the hood or cover 131. The size of the door is such relative to the size and inclination of the bin and the angle of repose of the fruit, that the falling fruit leave a substantially conical void extending to the normal bottom of the bin. The sample is thus comprehensive. The operator, utilizing the handle 134 and without dislodging the sample, opens the arcuate cover 131 against the action of an over-center spring 146 (FIG. 2) and permits the sample of fruit to roll out by gravity into the carton 31. He may release any desired portion of the total sample available as the remainder is subsequently returned to the bin automatically.

The cover 131 is then closed and the crank 91 is rotated in a clockwise direction (FIGURE 1) to restore the parts to their initial upright condition. Following this, the pin 141 is withdrawn from the disc 143. The crank is then turned counterclockwise (FIG. 1) and causes the plunger 112 to rise, lifting the lid 117 out of the open upper end of the bin 4. If the bin is to be rolled out or otherwise removed from the rear, the lever 61 (or the lever 81) is not disturbed, but if the bin is to be rolled out or otherwise removed from the forward end of the platform, the lever 61 (or the lever 81) is suitably manipulated to drop the retainers 52 or 88 for this purpose.

As a particular safety measure, when the bin is in its largely inverted FIGURE 2 position, a latch lever 151 (FIGS. 1, 2 and 8) is engaged with the side beam 37, being urged into engagement by a spring 152 wound around the pivot pin 153 for the lever 151 and holding the lever against a retaining pin 154. The use of the latch 151 is optional and, if it is used, it is manually retracted just prior to restoring the inverted bin to its initial position. As a further safety measure and to position the platform accurately, the upright 23 carries a retractable bolt 156 when projected engageable with a loop 157 on the frame 36 when the platform is horizontal. Conveniently, the bolt is spring pressed and snaps into position when the frame returns to upright position and is manually disengaged just before the frame is rotated.

What is claimed is:

1. A fruit bin sampler for use with a bin having an open top comprising a support, a frame, means for mounting said frame for rotation about a horizontal axis on said support, means on said frame for supporting a bin, means on said frame for restraining shifting of said bin, a lid adapted to fit the open top of said bin, said lid having an aperture therein, means on said support and on said frame for moving said lid into and out of engagement with said bin, means on said lid forming a chamber in communication with said aperture, means for blocking said aperture, and means for opening and closing said chamber.

2. A fruit bin sampler for use with a bin having an open top comprising a support, a frame, means for mounting said frame for tipping on said support, means for so tipping said frame for supporting and holding a bin on said frame, a lid adapted to fit the open top of said bin, said lid having a plurality of apertures therein, means for moving said lid into and out of engagement with said bin, means on said lid forming a plurality of chambers each in communication with one of said apertures, means for opening and closing said chambers, and means for blocking said apertures.

3. A fruit bin sampler comprising a support, a frame including a platform adapted to support a bin, means for mounting said frame for tipping on said support, a lid having an aperture therein, means for mounting said lid on said frame for movement toward and away from said platform, a chamber on said lid in communication with said aperture, and a cover for opening and closing said chamber.

4. A fruit bin sampler comprising a support, a frame including a platform, means for positioning a bin on said platform, means for mounting said frame for tipping on said support, means for so tipping said frame on said support, a lid having an aperture therein, means for moving said lid toward and away from said platform, a chamber on said lid in communication with said aperture, and a cover for opening and closing said chamber.

5. A fruit bin sampler comprising a lid adapted to fit a fruit bin and having a plurality of apertures therein, a plurality of chambers on said lid each communicating with one of said apertures, means for opening and closing said chambers, means for blocking said apertures, positioning means for positioning a bin in predetermined relation to said lid, and means for tipping said lid and positioning means between a first position wilth said chambers above said lid and second position with said chambers at least in part beneath said lid.

6. A fruit bin sampler comprising a lid adapted to fit a fruit bin and having an aperture therein, a chamber on said lid communicating with said aperture, means for opening and closing said chamber, positioning means for positioning a bin in predetermined relation to said lid, and means for tipping said lid and positioning means between a first position with said chamber above said lid and a second position with said chamber at least in part beneath said lid.

7. A sampling device comprising a support, a frame means for mounting said frame on said support for rotation about a horizontal axis, means including a plurality of rollers on said frame forming a platform for a bin, means for rotating said frame to invert said platform at least, partially, a liquid having an aperture therein and mounted on said frame spaced from said platform, means for moving said lid toward and away from said platform, a chamber on said lid in communication with said aperture, and means for opening and closing said chamber.

8. A fruit bin sampler comprising means for supporting and positioning a bin, means for closing said bin except for a selected portion thereof remaining open, means for at least partially inverting said supporting and positioning means, means for receiving and retaining fruit discharged through said open portion of said bin, and means movable to release said fruit from said receiving and retaining means.

9. A fruit bin sampler comprising means for supporting and positioning an open bin having articles therein, means for positioning a temporary lid on said bin and moving said bin to lodge at least some of said articles against said lid, a plurality of means on said lid affording access to said bin through different selected portions of said lid, and means for individually blocking each of said plurality of access means.

10. A fruit bin sampler comprising a support, a frame adapted to support a bin having an opening therein, means for mounting said frame for rotation about a horizontal axis on said support, a lid adapted to fit said opening, means for mounting said lid on said frame for movement into and out of said opening, means for so rotating said frame and moving said lid, a plurality of means on said lid affording access to said bin through different selected portions of said lid, and means for individually blocking selected ones of said access means.

References Cited in the file of this patent

UNITED STATES PATENTS

| | | |
|---|---|---|
| 1,270,756 | Holmberg | June 25, 1918 |
| 1,874,393 | Vignaux | Aug. 30, 1932 |
| 2,762,529 | Johnson | Sept. 11, 1956 |
| 2,939,593 | Kelly | June 7, 1960 |